(12) United States Patent
Kaufleitner et al.

(10) Patent No.: US 11,616,463 B2
(45) Date of Patent: Mar. 28, 2023

(54) SAFETY FUNCTION

(71) Applicant: B&R INDUSTRIAL AUTOMATION GMBH, Eggelsberg (AT)

(72) Inventors: Franz Kaufleitner, Eggelsberg (AT); Franz Spanlang, Eggelsberg (AT); Stefan Flixeder, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 137 days.

(21) Appl. No.: 17/109,923

(22) Filed: Dec. 2, 2020

(65) Prior Publication Data
US 2021/0167713 A1 Jun. 3, 2021

(30) Foreign Application Priority Data
Dec. 3, 2019 (AT) .............................. A 51053/2019

(51) Int. Cl.
*H02P 25/064* (2016.01)
*B65G 43/06* (2006.01)
*B65G 54/02* (2006.01)
*G05D 1/02* (2020.01)

(52) U.S. Cl.
CPC ............ *H02P 25/064* (2016.02); *B65G 43/06* (2013.01); *B65G 54/02* (2013.01); *G05D 1/0214* (2013.01); *G05D 1/0223* (2013.01)

(58) Field of Classification Search
CPC ....... H02P 25/064; H02P 25/06; B65G 43/06; B65G 54/02; G05D 1/0214; G05D 1/0223
USPC .................................................... 318/135, 34
See application file for complete search history.

(56) References Cited

U.S. PATENT DOCUMENTS

| 4,197,934 | A | * | 4/1980 | Matsui | .................... B61C 13/04 |
| | | | | | 198/465.1 |
| 4,665,831 | A | * | 5/1987 | Matsui | ...................... B61L 3/14 |
| | | | | | 104/165 |
| 5,121,830 | A | | 6/1992 | Sakamoto et al. | |
| 9,202,719 | B2 | | 12/2015 | Lu et al. | |
| 9,223,303 | B2 | * | 12/2015 | Horn | .................. G05B 19/0426 |
| 10,106,339 | B2 | * | 10/2018 | Prüssmeier | ............ B65G 35/06 |

(Continued)

FOREIGN PATENT DOCUMENTS

| AT | 518721 | 12/2017 |
| AT | 519 238 | 5/2018 |

(Continued)

OTHER PUBLICATIONS

Austria Search Report conducted in Austria Patent Application No. A 51053/2019 (dated Oct. 16, 2020).

*Primary Examiner* — David Luo
(74) *Attorney, Agent, or Firm* — Greenblum & Bernstein, P.L.C.

(57) ABSTRACT

In order to ensure particularly good protection of individuals in an electromagnetic transport system, a safety area is provided in a transport area. Furthermore, a safety function is provided which, in accordance with a predetermined safety requirement level, ensures that the transport unit reaches the safety area at a speed less than or equal to a safety speed and/or with a transport unit force less than or equal to a safety force and/or a transport unit energy less than or equal to a safety energy, or prevents the transport unit from reaching the safety area.

16 Claims, 9 Drawing Sheets

(56) References Cited

U.S. PATENT DOCUMENTS

2006/0220623 A1  3/2006  Andruzzi et al.
2012/0193172 A1  8/2012  Matscheko et al.

FOREIGN PATENT DOCUMENTS

DE    690 11 744    3/1995
WO    2019/075193   4/2019

\* cited by examiner

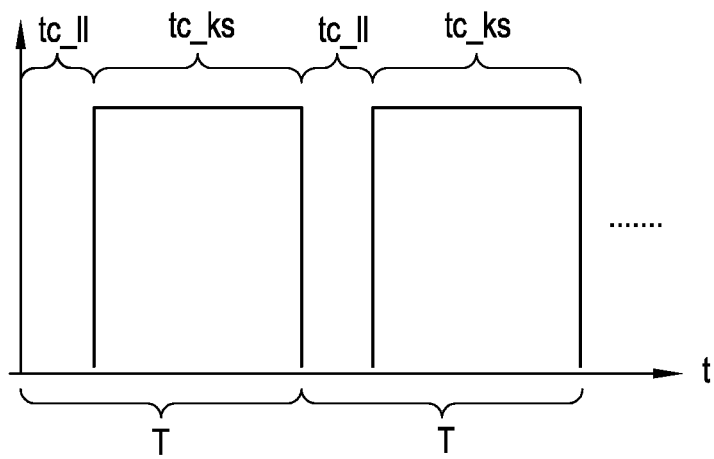
Fig. 7
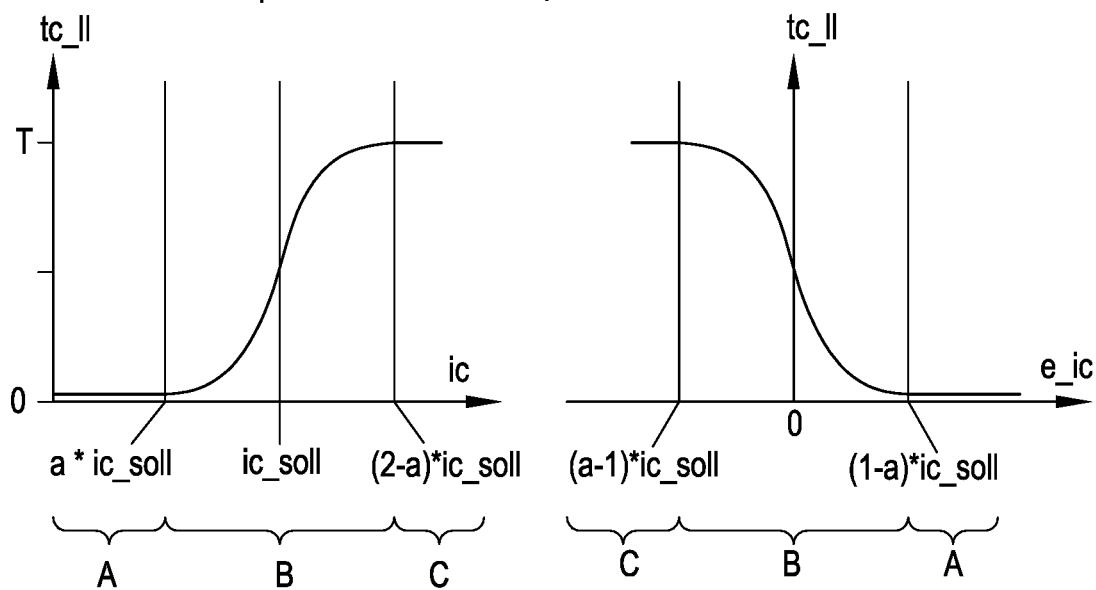
Fig. 8A    Fig. 8B
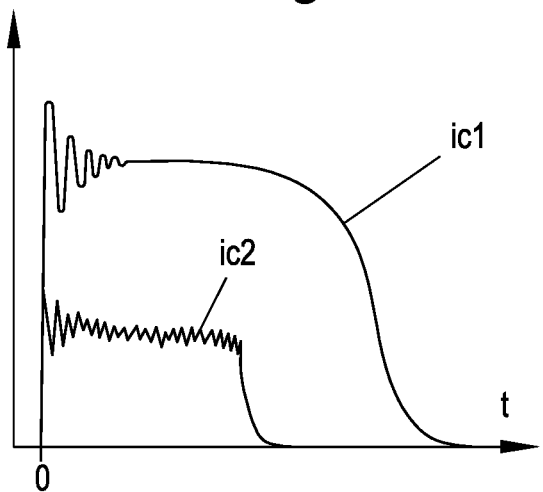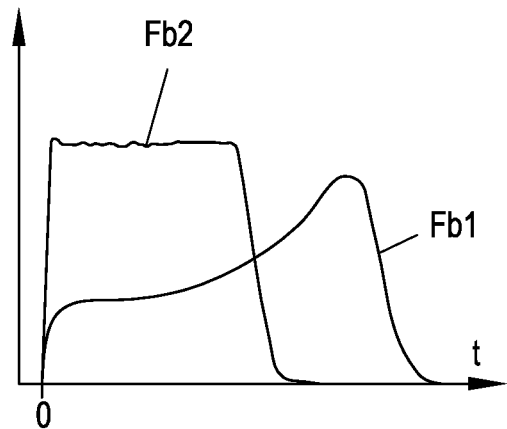
Fig. 9

SAFETY FUNCTION

CROSS-REFERENCE TO RELATED APPLICATION

The instant application claims the priority under 35 U.S.C. § 119(a) of Austria Application No. A51053/2019 filed Dec. 3, 2019, the disclosure of which is expressly incorporated by reference herein in its entirety.

The present invention relates to a method for controlling a transport unit of an electromagnetic transport system, preferably a long-stator linear motor or planar motor, the electromagnetic transport system comprising a control unit and drive coils arranged in a transport area, the control unit energizing the drive coils in normal operation in such a way that a magnetic field coupled to a transport unit is moved in the transport area in a movement direction in order to move the transport unit in the movement direction. The present invention further relates to an electromagnetic transport system, comprising a control unit, a plurality of drive coils arranged in a transport area and at least one transport unit, the control unit being designed to energize the drive coils in such a way that a magnetic field coupled to the transport unit moves in the transport area in a movement direction in order to move the transport unit in the movement direction.

An electromagnetic transport system comprises a transport area and one or more transport units, with drive coils being provided in the transport area. Magnets (usually permanent magnets) are similarly provided on the transport unit. By energizing the drive coils by means of a control unit, a moving magnetic field is generated in the transport area and interacts with the magnets on the transport unit. As a result, a propulsive force is generated on the transport unit, as a result of which the transport unit is moved in a movement direction in the transport area.

In order to meet the requirements of modern, flexible logistics units, long-stator linear motors (LLMs) are increasingly being used as electromagnetic transport systems as a replacement for conventional continuous conveyors, for example rotary-to-linear conversion units such as rotary motors on a conveyor belt. Long-stator linear motors are characterized by improved and more flexible utilization over the entire working range. Thus, the ranges of the speed and acceleration from zero to the maximum can be utilized. Other advantages which should be mentioned include individual regulation or control of the movable transport units (shuttles), improved energy utilization, reduction of maintenance costs due to the lower number of wear parts, ease of replacement of transport units, efficient monitoring, easier fault detection, and optimization of the current consumed by eliminating current gaps.

A stator of a long-stator linear motor forms a transport path and consists of a large number of drive coils arranged next to one another in the movement direction. These drive coils are actuated individually or in groups, with a plurality of drive coils often being grouped into transport segments. The transport path of the long-stator linear motor thus represents the transport area and is basically one-dimensional. This means that the movement of the transport unit is basically one-dimensional along a specified transport path. However, the transport path can be guided in space as desired and can also have branches and/or switches.

A planar motor can also be provided as the electromagnetic transport device, for example. A planar motor can be used in a production process, for example, whereby very flexible transport processes with complex movement profiles can be implemented. In contrast with a long-stator linear motor, a planar motor has a transport plane as the transport area. The transport plane is basically two-dimensional, for example in the xy plane. The drive coils are distributed in the transport plane in order to generate a magnetic field which can be moved in two dimensions in the transport plane. The magnets are advantageously arranged so as to be distributed in a two-dimensional manner on the transport unit in order to interact with the magnetic field and move the transport unit in the transport plane. The drive coils and the magnets are advantageously arranged in such a way that, in addition to a one-dimensional movement along the axes spanned by the transport plane (x axis and y axis in an xy plane), more complex two-dimensional movements of the transport unit in the transport plane are also possible. In principle, it is also possible that only a one-dimensional movement in the transport plane is provided. In this case, the magnets and drive coils can also be arranged only one-dimensionally. The mode of operation and structure of planar motors is known in principle and can be found in U.S. Pat. No. 9,202,719 B2, for example.

If a user or an unauthorized person enters a safety area of an electromagnetic transport system, it is necessary to protect this individual from injury in order to ensure that the individual is not endangered by the moving transport units in particular.

Electromagnetic transport systems are therefore often enclosed in order to prevent access by individuals. However, even with enclosed electromagnetic transport systems, it is necessary for a user to have access to the electromagnetic transport system, in particular when carrying out set-up work and/or maintenance work. For this reason, protective doors are often provided in the enclosure. However, access to the electromagnetic transport system through a protective door is time-consuming and increases the set-up time or maintenance time.

A particularly significant disadvantage, however, is that these protective doors override the actual protection provided by the enclosure, which means that opening a corresponding protective door again creates a high risk of injury to an individual. Furthermore, an enclosure increases the costs for the construction of the electromagnetic transport system.

In addition or as an alternative to an enclosure, the energy supply of the transport units of electromagnetic transport systems can also be switched off if a user or unauthorized person enters a safety area of the electromagnetic transport system. However, since the transport units have very high torques with very little friction, the system-internal braking properties are very low in the case of an energy release, for example a safe torque off function (STO function), which results in long braking distances. Active braking concepts which allow transport units to brake more quickly can help here. US 2012/193172 A1 discloses special brake windings attached to a linear motor to generate a braking effect, for example.

It is an object of the present invention to provide safety functions for an electromagnetic transport system which allow particularly effective protection of individuals.

According to the invention, this object is achieved by a method in which a safety area is provided in the transport area, with a safety function being provided which, in accordance with a predetermined safety requirement level, ensures that the transport unit reaches the safety area at a speed less than or equal to a safety speed and/or with a transport unit force less than or equal to a safety force and/or with a transport unit energy less than or equal to a safety energy, or prevents the transport unit from reaching the safety area.

Furthermore, the object is achieved by an electromagnetic transport system, with a safety area being provided in the transport area, with a safety module being provided which is designed, in accordance with a predetermined safety requirement level, to ensure that the transport unit reaches the safety area at a speed less than or equal to a safety speed and/or with a transport unit force less than or equal to a safety force and/or with a transport unit energy less than or equal to a safety energy, or to prevent the transport unit from reaching the safety area. The safety module is used to implement the safety function.

The safety function can be permanently active, but can also be activated by triggering a safety state.

The safety state can be triggered, for example, when individuals are in a hazardous area of the electromagnetic transport system, in particular in the safety area itself. For example, light barriers, laser scanners, camera systems, safety contacts on protective doors, etc. can be provided to identify the individuals. The safety state can, however, also be triggered in the case of overloading of the system, excessive voltage levels or also e.g. loss of position or speed information. On the other hand, the safety state can be triggered for example by triggering an emergency signal.

By providing the safety function according to the invention in accordance with the predetermined safety requirement level, complex enclosures for the electromagnetic transport system can be dispensed with, and so the risk of access through a protective door is eliminated. This facilitates the cooperation between a user and the electromagnetic transport system, which increases the effectiveness and flexibility of the operation of the electromagnetic transport system.

The safety requirements can be implemented in accordance with international standard series and/or standards, for example the IEC 61508 standard series, where IEC 61508 as a standard series has editions rather than an issue date. Either the safety requirements of IEC 61508 Ed. 1 or Ed. 2 can be used. The IEC 61508 standard series distinguishes between different safety requirement levels (SIL—safety integrity level) depending on the risk of a hazard. SIL 0 describes a very low risk and SIL 4 a very high risk, with the remaining residual risk depending on the selected safety requirement level. Depending on the selected safety requirement level, design and quality assurance measures can be defined to ensure the functionality of the safety function. It is particularly important to ensure that, if a safety-relevant element of the electromagnetic transport system fails, it does not end up in an undefined and thus potentially dangerous state.

The safety function is preferably at least partially, preferably completely, redundant. A failure of components of the safety function can thus be prevented. Since an electromagnetic transport system, for example a long-stator linear motor or a planar motor, usually comprises a plurality of transport segments, a redundancy can be implemented by a combination of opposite or successive transport segments. For this purpose, the safety function can be implemented separately and redundantly on each of the transport segments involved, which is particularly advantageous if the individual transport segments each represent a closed drive element. In this case, a mutual dependency of the redundant designs can be reduced or completely avoided.

The safety function preferably comprises a diagnostic function which checks the functionality of the safety function.

The function of the safety function can thus be checked and ensured, preferably in all operating states.

The safety function preferably fulfills at least safety requirement level 1 (SIL 1) according to the IEC 61508 standard series.

This ensures single-fault safety, which means that, after a fault has occurred in the safety function, the function of the safety function itself continues to be ensured.

The safety function preferably fulfills further safety requirements according to at least one of the IEC 61508 standard series and/or the ISO 13849-1:2015-12, IEC 62061:2005 standards.

Accordingly, the safety module can fulfill at least safety requirement level (SIL) 1 according to the IEC 61508 standard series, and particularly preferably can fulfill further safety requirements of at least one of the IEC 61508 standard series and/or the ISO 138491:2015-12, IEC 62061:2005 standards.

The safety function in the transport area may of course include a plurality of safety areas that meet the same or different safety requirement levels. Similarly, the same or different safety areas and/or safety requirement levels can apply to different transport units.

The safety area is preferably provided in a stationary manner in the transport area, the safety area particularly preferably comprising at least a part of a transport segment of the transport area that is arranged in front of the transport unit in the movement direction.

In this way, a permanently provided safety area can be implemented in the transport area, which safety area describes for example a particularly safety-relevant portion, e.g. a critical transport segment.

The position of the safety area in the transport area can also be determined dynamically. The safety area can begin and/or end at the beginning or end of a transport segment, but also at a fixedly predetermined or flexibly determined distance before or after a transport segment and/or a transport unit or a fixedly predetermined position on the transport area. A flexible position of a safety area and/or a flexible distance of a safety area before or after a transport segment and/or a transport unit can be determined for example on the basis of prevailing parameters of the transport unit (speed, load, movement direction, properties (e.g. temperature) of the transported goods, . . . ), a position of an individual, etc.

A safe deceleration area can be provided in front of the transport unit in the movement direction, the safety area beginning after the safe deceleration area. In the case of a planar motor as the electromagnetic transport system, a deceleration area can be arranged around the safety area, for example.

The safe deceleration area can be fixedly predetermined or flexibly determined (e.g. on the basis of prevailing parameters). A safe deceleration area can be, for example, an ensured braking distance of the transport unit. The safety area can (via the deceleration area) depend only on the position of the transport unit (and any prevailing parameters). However, mixed forms are also conceivable in which the safety area is fundamentally dependent on the position of the transport unit, but is established in relation to (structural) properties of the transport area. For example, a transport segment in front of the transport unit in the movement direction, for example the next transport segment in front of the transport unit in the movement direction, can be defined as the safety area. The safety area is thus dependent on the position of the transport unit and on the arrangement of the transport segment in the transport area. Here, too, it is possible for a safety area to comprise a fixedly predetermined or flexibly determined part of the transport area before or after a transport segment which lies in front of the transport unit in the movement direction. Likewise, a safety area can begin only after a fixedly predetermined or flexibly determined distance before or after a transport segment which is in front of the transport unit in the movement direction.

Preferably, the safety module comprises a braking element which is arranged on the transport unit and/or in the transport area and is designed to ensure, as part of the safety function in accordance with a predetermined safety requirement level, that the movement of the transport unit is braked in such a way that it reaches the safety area at a speed less than or equal to a safety speed and/or with a transport unit force less than or equal to a safety force and/or with a transport unit energy less than or equal to a safety energy, or to prevent the transport unit from reaching the safety area.

As part of the safety function, the braking element has the task of reducing the speed of the transport unit in such a way that it is less than or equal to a safety speed when the safety area is reached, and/or of reducing the transport unit force of the transport unit in such a way that it is less than or equal to a safety force and/or of reducing the safety energy in such a way that it is less than or equal to a transport unit energy or does not even reach the safety area.

The safety speed and/or safety force and/or safety energy can be fixedly predefined or flexibly established, for example on the basis of prevailing parameters. The braking element can comprise an electrical, electromechanical, pneumatic or hydraulic braking system and must fundamentally meet the predefined safety requirement level. Depending on the selected safety requirement level, it may also be necessary to ensure that electrical and/or electromechanical and/or pneumatic and/or hydraulic components are dimensioned to meet the relevant safety requirement level.

A transport segment with particularly high forces can be provided as the braking element, for example, which segment is able to decelerate or bring the transport unit to a standstill before the safety area by the action of these forces.

Furthermore, a magnetic and/or magnetizable braking object which can be provided on the transport unit and/or in the transport area can be provided as the braking element. As part of the safety function, the braking object can be magnetically coupled to a counter braking object, by which the speed of the transport unit is reduced. This deceleration can take place through reluctance forces, which counteract the movement of the transport unit. In the case of a mechanical transport unit guided in the movement direction, the braking effect can also be increased by those parts of the reluctance force that are normal to the mechanical guide system, since the frictional resistance is typically a function of the normal force. Furthermore, a deceleration can occur due to eddy currents induced by changes in the magnetic field over time, which counteract the movement of the magnetic field and thus of the transport unit. Of course, the mentioned magnetic mechanisms of action can also be combined for deceleration.

Since said magnetic mechanisms of action decrease exponentially with distance, an increased braking effect can be achieved when the transport unit approaches a magnetic and/or magnetizable braking object. Furthermore, said magnetic mechanisms of action increase linearly with the effective area. An increased braking effect can be achieved by increasing the effective area, for example by sliding the braking object laterally between the transport unit and the transport segment.

As part of the safety function, the distance between the braking object and the counter braking object can thus be reduced and/or the effective area of the braking object and/or the counter braking object can be increased and the transport unit can thus be decelerated.

If the distance between the braking object and the counter braking object is greater than zero, the deceleration takes place without contact.

Furthermore, a nozzle for injecting a gas or liquid jet, for example an air or water jet, can be provided as the braking element, with the gas or liquid jet braking the transport unit.

Likewise, a preferably mechanically resilient braking object which can be provided on the transport unit and/or in the transport area can be provided as the braking element. As part of the safety function, the braking object can be brought into contact with a counter pressure object, which decelerates the transport unit. The braking object and the counter pressure object can thus act like a shoe brake.

A magnetic and/or magnetizable braking object can also be combined with a mechanical and/or resilient braking object. A braking element combined in this way brakes without contact for a distance greater than zero between the braking object and the counter braking object and brakes with increased force when the braking object is brought into contact with the counter pressure object.

The safety module preferably comprises a blocking element which is arranged on the transport unit and/or in the transport area and is designed, with a predetermined safety requirement level, to ensure that the movement of the transport unit is blocked in such a way that reaching the safety area is prevented.

The blocking element essentially prevents the transport unit from reaching and entering the safety area. The blocking element can comprise electrical and/or electromechanical and/or hydraulic and/or pneumatic components, the required safety functions being taken into account when dimensioning the respective components.

The blocking element can be a preferably mechanically resilient blocking object, such as a bolt. As part of the safety function, the blocking object can be brought into engagement with a counter blocking object, thus blocking the movement of the transport unit before reaching the safety area.

A blocking element can also be combined with a braking element, for example by also using a braking object as a blocking object. The combined braking object and blocking object thus brakes when it is brought into contact with a counter pressure object and blocks when it is brought into engagement with a counter blocking element. Such a combined element can optionally be used as a blocking element or braking element depending on the safety requirement level, the speed of the transport unit, or other predetermined parameters, with it being possible for the counter pressure object and the counter blocking object to also be identical.

The safety module preferably comprises a deflection element which is arranged on the transport unit and/or in the transport area and is designed, with a predetermined safety requirement level, to ensure that the movement of the transport unit is deflected out of the safety area before reaching the safety area.

It can thus be ensured that the transport unit does not enter the safety area, since the deflection prevents it from getting into the safety area.

A deflection can be effected by a mechanical deflection element, for example a mechanical switch. The deflection element can comprise electrical and/or electromechanical and/or hydraulic and/or pneumatic components, the required safety functions being taken into account when dimensioning the respective components.

Furthermore, deflection can take place without contact. A nozzle for injecting a gas or liquid jet, for example an air or water jet, can be provided as the deflection element, the gas or liquid jet deflecting the transport unit in such a way that the transport unit does not reach the safety area. A magnetic and/or electromagnetic deflection element may be provided, the deflection element deflecting the transport unit by the action of magnetic and/or electromagnetic force in such a way that the transport unit does not reach the safety area.

A safety module comprising a combination of braking elements and/or blocking elements and/or deflection elements is of course also conceivable. The safety module or safety function must fundamentally meet the predetermined safety requirement level. Depending on the embodiment, the braking elements and/or blocking elements and/or deflection elements that are included must also meet the predetermined safety requirement level.

As part of the safety function, at least some of the drive coils can be in open-circuit operation for at least a period of time.

This means that the relevant drive coils are de-energized so that the transport unit can no longer be actively moved. Open-circuit operation can be advantageous in particular in combination with braking elements and/or blocking elements and/or deflection elements.

Preferably, as part of the safety function, at least some of the drive coils are in short-circuit operation for at least a period of time.

This brakes the transport unit and, analogously to the use of braking elements in accordance with a predetermined safety requirement level, ensures that the transport unit reaches the safety area at a speed less than or equal to a safety speed and/or with a transport unit force less than a safety force and/or with a transport unit energy less than a safety energy or prevents the transport unit from reaching the safety area.

The transport unit moves without suitable actions in the transport area of the electromagnetic transport system until it comes to a standstill with slight deceleration (due to the desired smooth or low-friction mounting or guidance of the transport units in the transport area), with the transport unit itself generating a moving magnetic field by means of the excitation magnets. This magnetic field moves with the transport unit in the transport area and thus also has the speed of the transport unit. This magnetic field also interacts with the drive coils, which would have no effect with open terminals of the drive coils. However, the drive coils, which are magnetically coupled to the transport unit, each induce a coil short-circuit current via an electromagnetic force (EMF) when the terminals are short-circuited. This coil short-circuit current counteracts the magnetic field caused by the transport unit according to Lenz's law, thus decelerating the transport unit relatively quickly. The short-circuit of at least some of the drive coils is thus preferably maintained permanently.

It is particularly preferred if, as part of the safety function, at least some of the drive coils are in short-circuit operation for at least a first period of time and at least some of the drive coils are in open-circuit operation for at least a second period of time.

This brakes the transport unit particularly effectively and, analogously to the use of braking elements in accordance with a predetermined safety requirement level, ensures that the transport unit reaches the safety area at a speed less than or equal to a safety speed and/or with a transport unit force less than a safety force and/or with a transport unit energy less than a safety energy, or prevents the transport unit from reaching the safety area.

In the case of a short-circuit, the relevant coil terminals are closed; in the case of open-circuit operation, the relevant coil terminals are open. With a suitable choice of the first and second period of time, the short-circuit current (as the sum of the respectively flowing coil short-circuit currents) can be regulated such that a larger current component is achieved in the propulsive force direction (i.e. in a Cartesian field-oriented dq coordinate system in the q direction). This increases the proportion of the short-circuit current which counteracts the field direction serving the propulsion movement, thus achieving a greater braking effect than with a permanent short-circuit and bringing the transport unit to a standstill even faster. Thus, even with lower short-circuit currents, a higher braking force and thus better and faster braking of the transport unit can be achieved. In addition, a lower current load and lower field weakening are achieved. Lower field weakening also causes a lower normal force decrease, which may, under certain circumstances, additionally prevent the transport unit from lifting off the transport area at a certain speed, in particular if the movement direction describes a curve.

Advantageously, a total short-circuit current flowing through the drive coils is determined, and a target short-circuit current with a maximum, propulsive-force-generating short-circuit current component icq is determined by means of a predetermined relationship. In the regulated short-circuit mode, in a short-circuit phase in which the short-circuit current is less than the target short-circuit current, at least some of the drive coils can be in short-circuit operation. In an open-circuit phase in which the short-circuit current reaches or exceeds the target short-circuit current, at least some of the drive coils can be in open-circuit operation.

However, in the regulated short-circuit mode, in a short-circuit phase in which the short-circuit current is less than the target short-circuit current multiplied by a factor, at least some of the drive coils are in short-circuit operation. In a mixed phase in which the short-circuit current is equal to or exceeds the target short-circuit current multiplied by a factor, at least some of the drive coils are alternately in short-circuit and in open-circuit operation. In an open-circuit phase in which the short-circuit current is equal to or exceeds the target short-circuit current multiplied by the term 2 minus factor a, at least some of the drive coils are in open-circuit operation.

Preferably, the predetermined relationship corresponds to f:

$$ic\_soll = \frac{1}{\sqrt{2}} \frac{\Psi}{L},$$

where $\Psi$ corresponds to the main flow and L corresponds to the unsaturated inductance and the relationship can be derived from the stator voltage equation for a multi-phase power supply.

In the mixed phase, at least some of the drive coils can in each case alternately be in short-circuit operation for a short-circuit interval and in open-circuit operation for an open-circuit interval, the duration of the short-circuit interval being determined with respect to the open-circuit interval and advantageously being calculated using a third-order polynomial with an error deviation.

Furthermore, a factor of 0.85 can be chosen, which causes a particularly good braking effect, as has been confirmed in practice.

It is particularly advantageous if only the drive coils magnetically coupled to the transport unit are switched to the regulated short-circuit mode. Thus, not all the drive coils of the entire electromagnetic transport system have to be switched to the short-circuit mode. For example, only one transport unit can be braked as needed, while the other transport units are not affected by the braking process.

For this purpose, the drive coils magnetically coupled to the transport unit can be determined by means of a position sensor. This can be advantageous if position sensors are already provided on the electromagnetic transport system in any case.

However, the drive coils magnetically coupled to the transport unit can also be detected via a coil short-circuit current induced in the relevant drive coil. This induced coil short-circuit current suggests a magnetic coupling with a transport unit.

Of course, other drive coils can also be switched into the regulated short-circuit mode as required, for example a certain number of drive coils located in front of the transport unit in the movement direction, etc.

The duration of the braking process depends, in addition to the choice of the first and second period of time, on the mass of the transport unit and on additional masses associated with the transport unit (transported goods, workpiece, . . . ) and/or on the speed of the transport unit. The energy that is released during the braking process is converted primarily into heat in the winding resistors (copper losses) and in the iron (primarily eddy current losses).

A short-circuit can mean different switch settings for different embodiments of a control unit. If the control unit has full bridges, as in US 2006/0220623 A1, each with four switches per drive coil, a full short-circuit can be switched during the regulated short-circuit in the short-circuit phase or the short-circuit interval. However, if the control unit has half-bridges comprising one upper and one lower switch per drive coil (see AT 518 721 A1), the short-circuit is modulated in the short-circuit phase or the short-circuit interval. This means that the upper switch of the half-bridge is switched through alternately with the lower switch of the half-bridge, preferably in a ratio of 50/50. However, the upper switch and the lower switch must not be switched through simultaneously.

In the embodiments relating to the operation of the drive coils, the safety module can access the control unit of the electromagnetic transport system or it can also be part of the control unit. Here, too, the requirements of the predetermined safety requirement level must be complied with, for example in the form of a redundant design of the control unit. It can also be the case that drive coils are actuated in a nested manner by different control units. This means that if one control unit fails, the other, non-failed control unit can continue to provide for short-circuit and/or open-circuit operations of drive coils.

A plurality of safety areas with associated safety functions can also be provided in the transport area. The safety functions can in each case be permanently active or can be activated by a safety state, and a transport area can comprise permanently active and activatable safety functions. The safety functions of a transport area can of course also be implemented differently, for example by means of braking elements and/or blocking elements and/or deflection elements, etc.

Multiple safety functions can also be provided in a safety area of a transport area, each of which is permanently active and/or can be activatable. This can also be interpreted as overlapping individual safety areas. The safety functions of a safety area can also be implemented differently, for example by means of braking elements and/or blocking elements and/or deflection elements, etc.

The present invention is described in greater detail below with reference to FIG. 1 to 9, which show schematic and non-limiting advantageous embodiments of the invention by way of example, and in which.

Figure 2A:
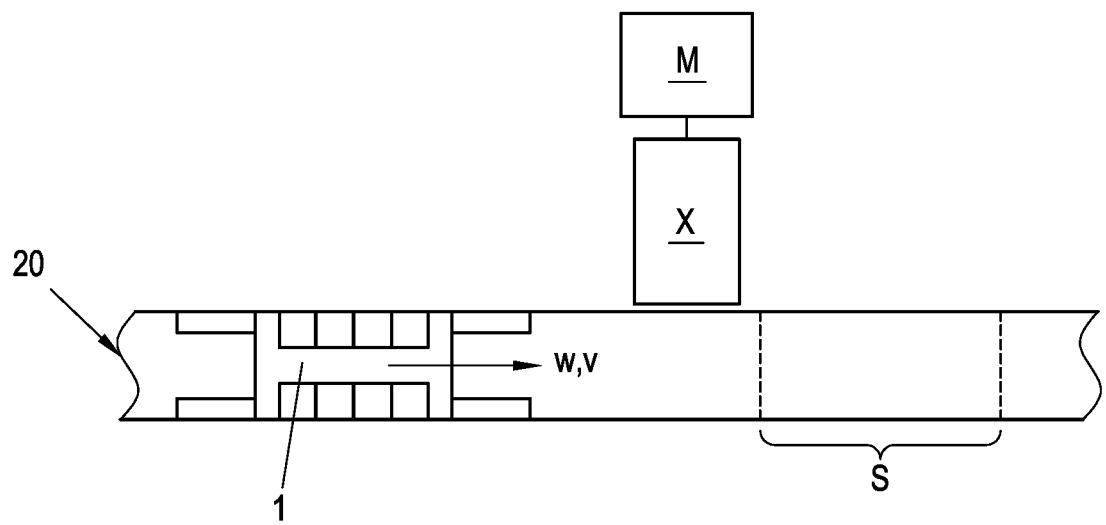
Figure 2B:
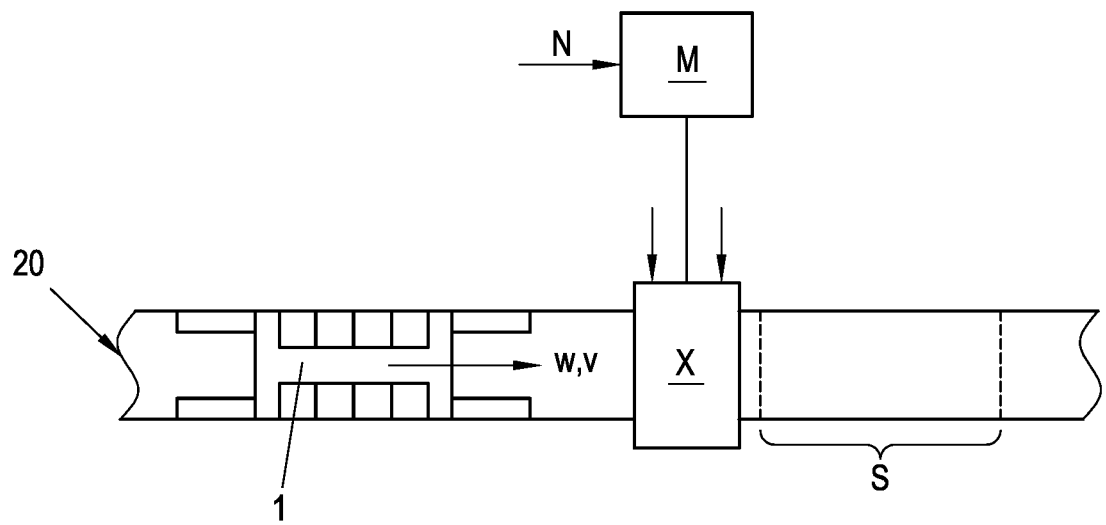
Figure 2C:
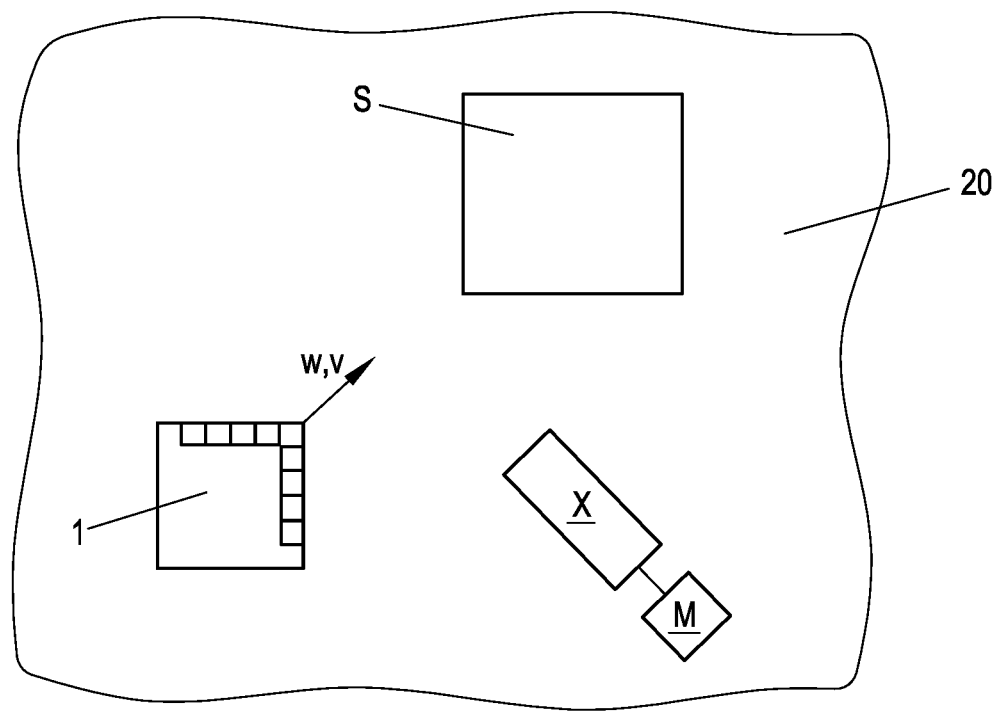
Figure 3A:
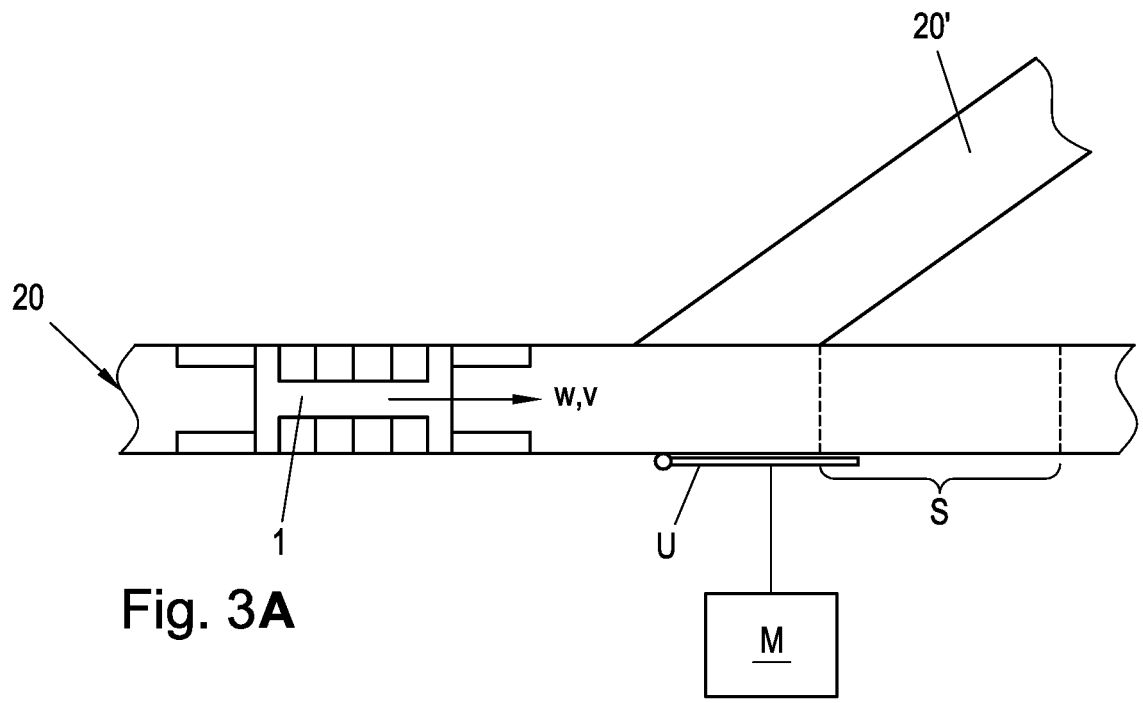
Figure 3B:
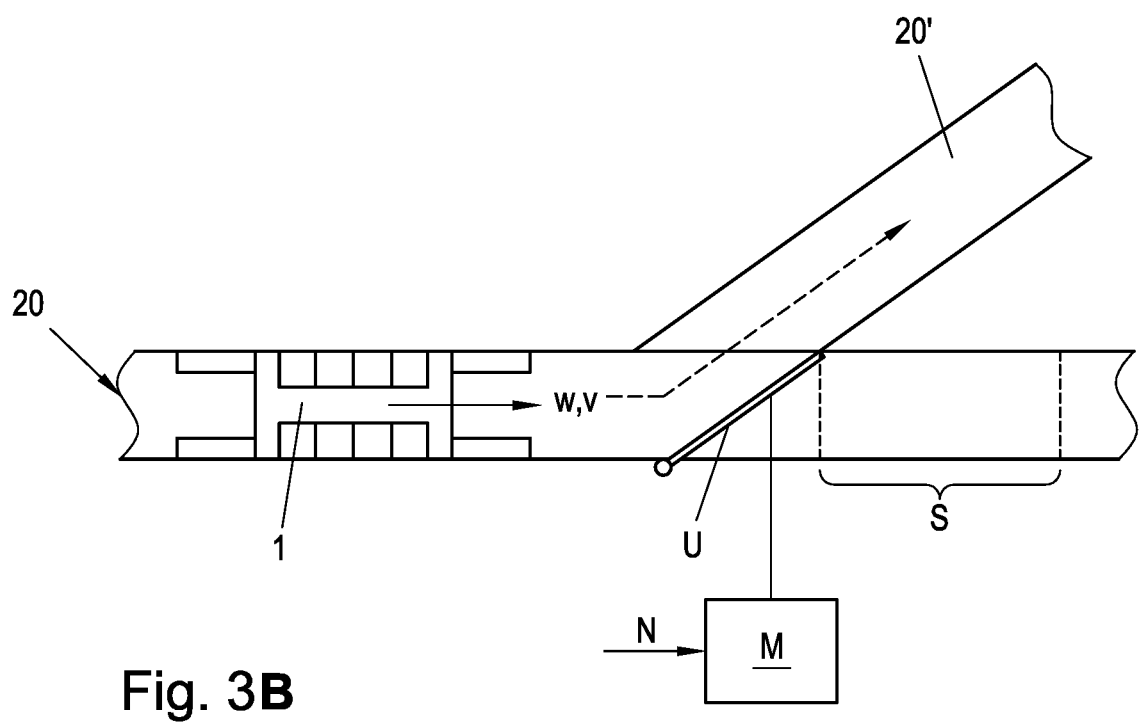
Figure 3C:
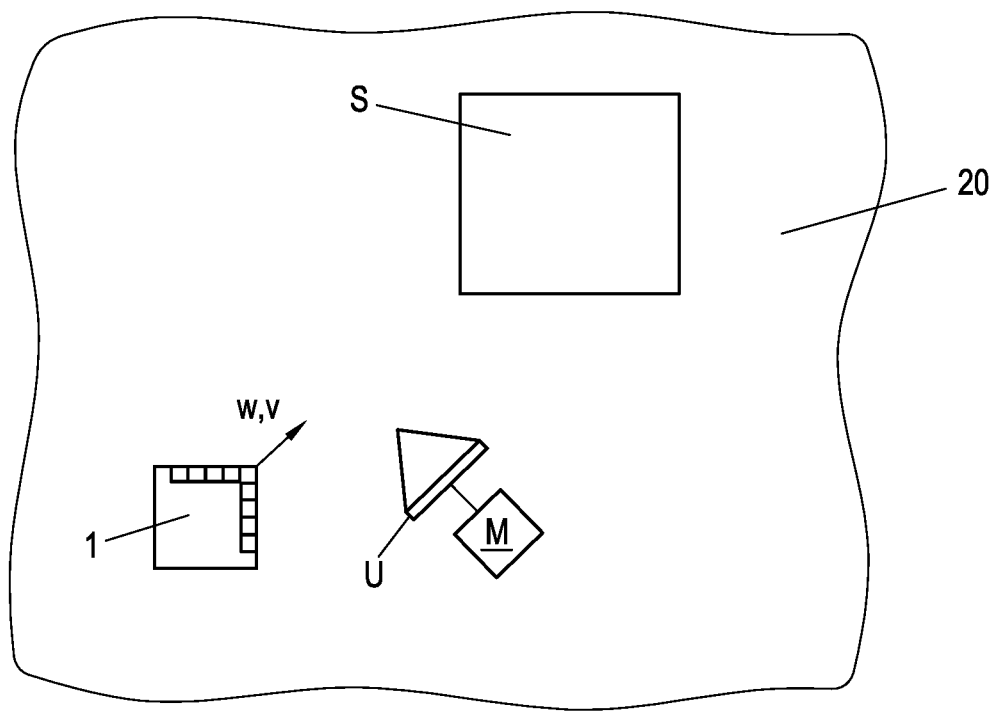
Figure 4A:
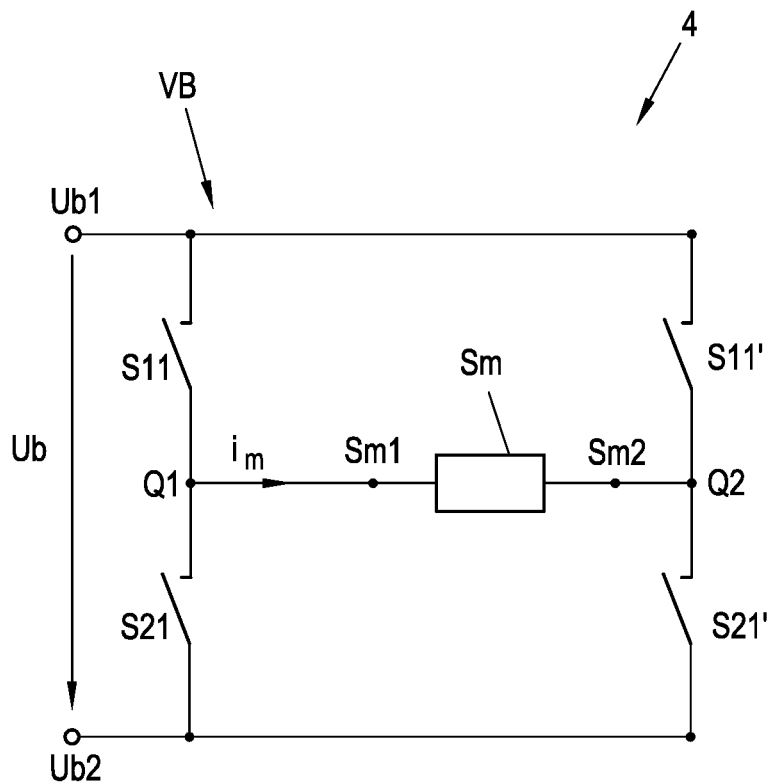
Figure 4B:
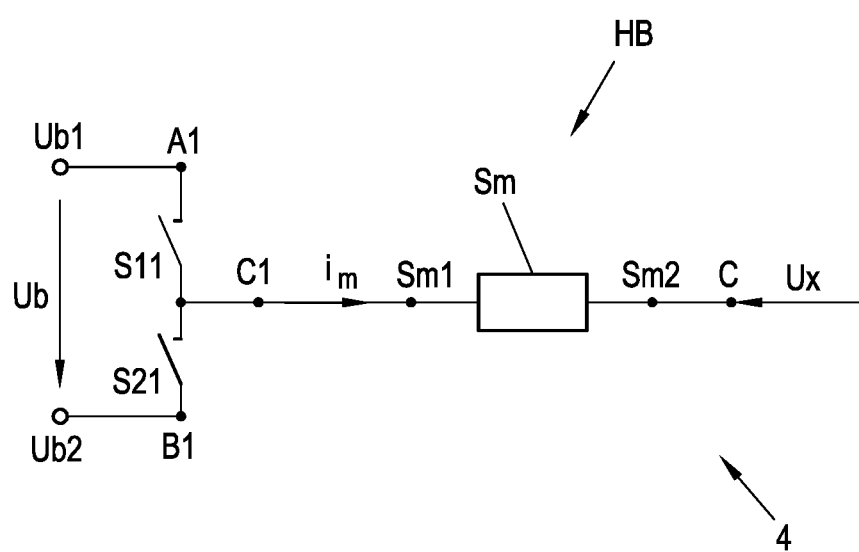
Figure 5:
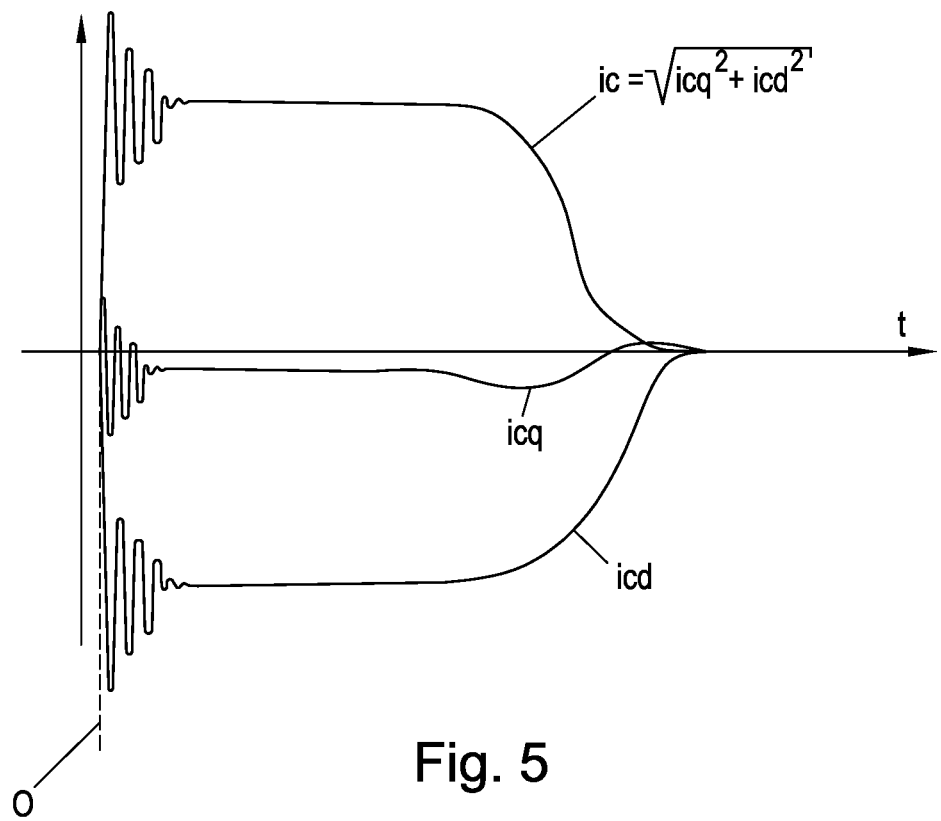
Figure 6:
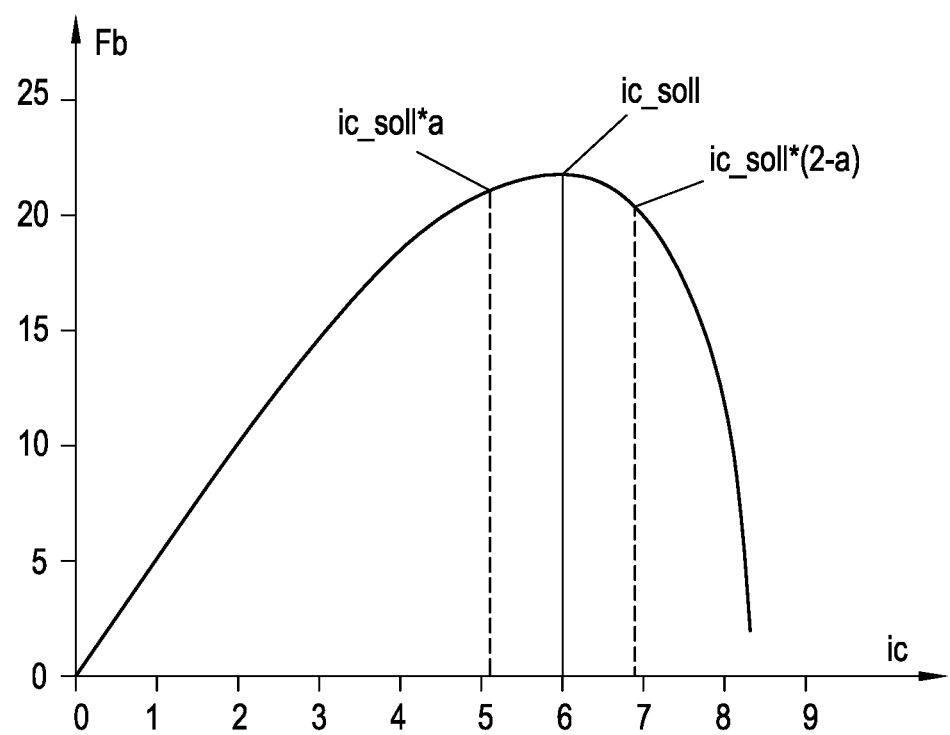

FIG. 2A, B show a safe blocking element in a long-stator linear motor,

FIG. 2C, D show a safe blocking element in a planar motor,

FIG. 3A, B show a safe deflection element in a long-stator linear motor,

FIG. 3C, D show a safe deflection element in a planar motor,

FIG. 4A shows a full bridge for actuating a drive coil,

FIG. 4B shows a half-bridge for actuating a drive coil,

FIG. 5 shows a plot over time of the torque-forming short-circuit current, the field-forming short-circuit current and the short-circuit current, combined from multiple overlapping coils, FIG. 6 shows an approximation of the braking force as a function of the short-circuit current, FIG. 7 shows a typical switching pattern for the short-circuit interval and the open-circuit interval, FIGS. 8A and B show plots of the short-circuit interval against the short-circuit current and the error deviation, FIG. 9 shows a plot over time of a first and second short-circuit current of a plurality of drive coils and a first and second generated braking force.

Figure 1A:
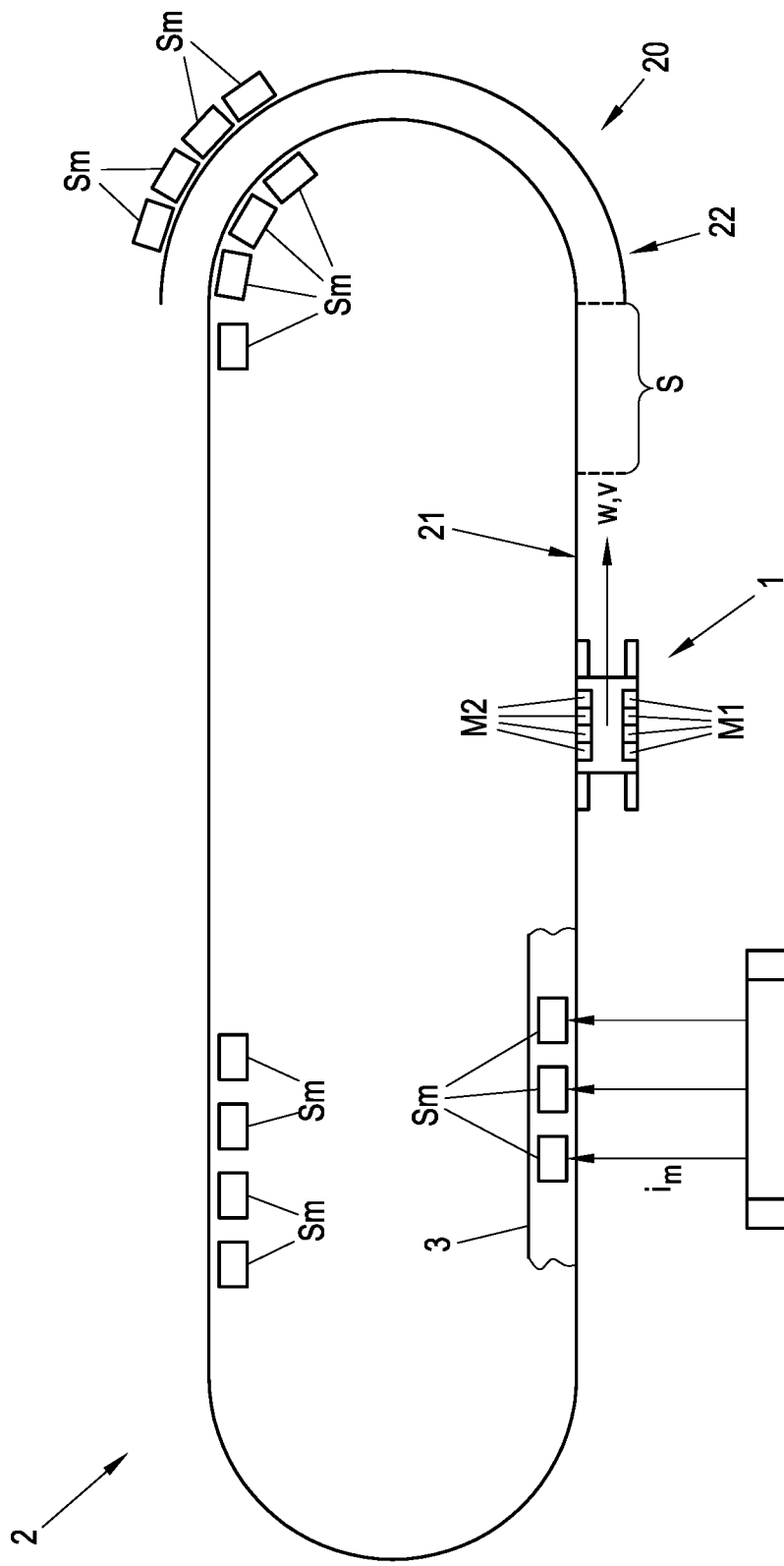
FIG. 1A shows a long-stator linear motor with a safety area.

FIG. 1A shows a simple example of a long-stator linear motor as an electromagnetic transport system 2. The long-stator linear motor has a closed transport path as the transport area 20. A large number m of drive coils Sm are arranged one after the other on the transport path in the movement direction w of a transport unit 1, each of which coils is energized with a coil current $i_m$ in normal operation under the control of a control unit 4 (only shown for some drive coils Sm) in order to generate a moving magnetic field. The arrows marked with $i_m$ are of course only shown schematically. The drive coils Sm can also be connected to the control unit 4 in a different manner in order to energize the drive coils Sm with the coil current $i_m$. The control unit 4 can be in the form of suitable hardware and/or in the form of software running on suitable hardware.

The drive coils Sm arranged next to one another in the movement direction w are arranged on the transport path on a stationary support structure 3 (only indicated in FIG. 1). The transport units 1 are moved along the transport path in a movement direction w, and are each guided and held in a suitable manner on the stationary transport path.

A transport unit 1 has laterally arranged first magnets M1 in the movement direction w and, as shown in FIG. 1, can also have laterally arranged magnets M2 which can be located opposite the first magnets M1 in a transverse direction transverse to the movement direction w. If the transport unit 1 has first magnets M1 and second magnets M2 on two sides, drive coils Sm can be suitably provided on both sides of the transport path (viewed in the movement direction w) which interact with the respective magnets M1, M2 to cause the transport units 1 to move. For movement, preferably only the drive coils Sm in the region of the magnets M1, M2 are supplied with power by the control unit 4, and this region can also comprise drive coils Sm which are located before and/or after the transport unit 1. Of course, more than one transport unit 1 can also be moved along the transport path, and each transport unit 1 can be moved independently of the other transport units 1 (in direction, position, speed and acceleration) by appropriately energizing the drive coils Sm in the region of the transport unit 1. Current sensors can be provided to determine the position of the transport unit 1 on the stator and thus to determine the coils Sm which are currently to be energized and which are located along the transport path at the transport unit 1, for example.

Depending on the application and requirements, the transport path can have any desired shape, and can comprise closed and/or open path sections. The transport path does not have to lie in one plane, but can also be guided in space as desired. Usually, a transport path consists of a plurality of combined transport segments each having a number of drive coils Sm. Likewise, switches are also known to guide a transport unit 1 from a first transport path to a second transport path.

Figure 1B:
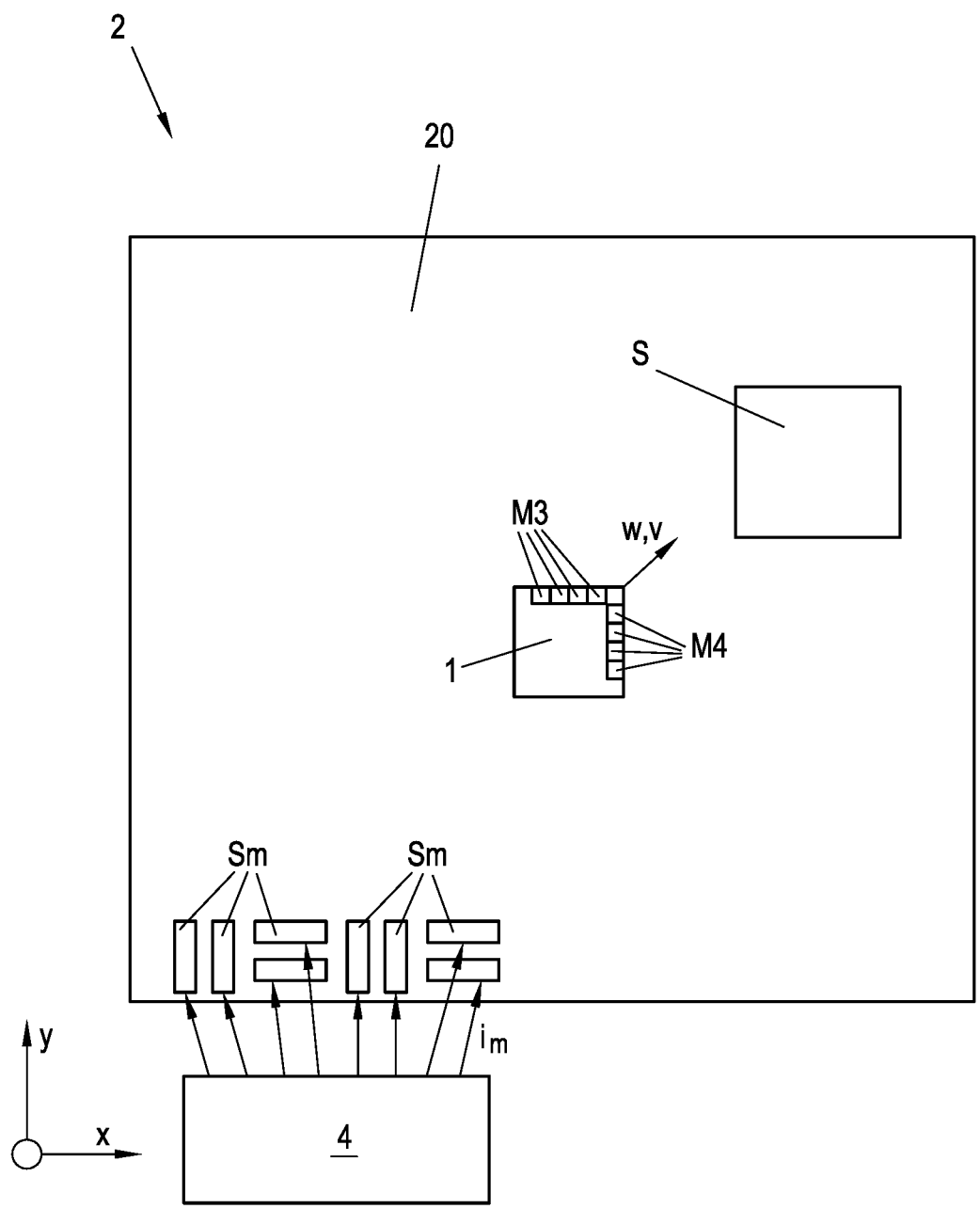
FIG. 1B shows a planar motor with a safety area.

FIG. 1B shows a simple example of an electromagnetic transport system 2 as a planar motor. The planar motor has a transport plane as the transport area 20. A large number m of drive coils Sm are arranged in the transport plane, created here in the xy plane. The drive coils Sm are arranged here in the x axis and the y axis only by way of example and are each energized with a coil current $i_m$ in normal operation under the control of a control unit 4 (only shown for some drive coils Sm) in order to generate a magnetic field moving in the transport plane. The drive coils Sm can also be connected to the control unit 4 in a different manner in order to energize the drive coils Sm with the coil current $i_m$. The control unit 4 can be in the form of suitable hardware and/or in the form of software running on suitable hardware.

The drive coils Sm generate a magnetic field in the transport plane in order to move the transport units 1 in the transport plane. For this purpose, the transport unit 1 has magnets M3, M4, which are preferably arranged parallel to the drive coils Sm. In the embodiment shown, the magnets M3 are arranged in the x axis and the magnets M4 are arranged in the y axis. For movement of the transport unit 1, preferably only the drive coils Sm in the region of the magnets M3, M4 are supplied with power by the control unit 4, and this region can also comprise drive coils Sm which are located before and/or after and/or to the side of the transport unit 1. By suitably actuating the drive coils Sm, the transport unit 1 can also be moved in a movement direction w that is not parallel to one of the axes of the transport plane, as is also shown in the figures. Of course, more than one transport unit 1 can also be moved in the transport plane, and each transport unit 1 can be moved independently of the other transport units 1 (in direction, position, speed and acceleration) by appropriately energizing the drive coils Sm in the region of the transport unit 1. Current sensors can be provided to determine the position of the transport unit 1 in the transport plane and thus to determine the coils Sm which are currently to be energized and which are located in the transport area 20 at the transport unit 1, for example. Depending on the application and requirements, the transport plane can have any desired shape, and can also be guided in space as desired. Furthermore, the transport plane often consists of a plurality of transport segments arranged next to one another.

The propulsive force required to move a transport unit 1 of an electromagnetic transport system 2 is known to be formed by the propulsive-force-generating current component iq (q component) of a drive current $i_A$. The drive current $i_A$ corresponds to the vectorial total current of all coil currents $i_m$ of the drive coils Sm acting on the transport unit 1.

If a long-stator linear motor is provided as the transport system, the drive current is a current vector with a q and a d component (current component that generates normal force). If a planar motor is provided as a transport system, the drive current is a current vector with two q components and one d component (current component that generates normal force).

Thus, for the normal forward movement of the transport unit 1, the propulsive-force-generating current component(s) iq (q component(s)) is sufficient. The normal force not serving the forward movement is formed by the normal-force-generating current component id (d component) of the drive current $i_A$.

In a long-stator linear motor or planar motor, usually a plurality of drive coils Sm act simultaneously on the transport unit 1 in order to achieve a movement at the speed v in the movement direction w. If no d components are present, the propulsive-force-generating current component iq corresponds to the vectorial total current of all coil currents $i_m$ of the drive coils Sm acting on the transport unit 1. The propulsive-force-generating current component iq calculated in the control unit 4 must therefore still be converted and distributed to the actual coil currents $i_m$ of the drive coils Sm and applied thereto, which is well known.

A safety area S is provided in the transport area 20 in front of the transport unit 1 in the movement direction w. This safety area 20 can be provided in a stationary manner in the transport area 20 and can comprise a transport segment of the transport area 20, for example. Of course, it is also possible that a safety area S comprises a fixedly predetermined or flexibly determined part of the in the transport area 20 before or after a transport segment or that it only begins after a fixedly predetermined or flexibly determined distance before or after a transport segment.

In the case of a planar motor as the electromagnetic transport system 2, the safety area S can also enclose the intended working range in which the transport unit 1 is allowed to move. This can prevent a transport unit 1 from moving out of the transport plane.

A safety area may also have other limitations that differ from those of non-safe areas: Different maximum speeds, different maximum currents, different minimum distances between shuttles.

The safety area S can also depend purely on the position of the transport unit 1. For instance, a safe deceleration area V of the transport unit 1 can be provided, with the safety area S beginning after the safe deceleration area V. The safety area S can likewise also depend on the position of an individual.

If a long-stator linear motor is provided as the electromagnetic transport system 2, the safety area S can be considered to be a section of the transport path, as shown in FIG. 1A. If a planar motor is provided as the electromagnetic transport system 2, the safety area S can be considered to be a flat sub-area of the transport plane, as shown in FIG. 1B.

As a mixed form, the safety area S can also be fundamentally dependent on the position of the transport unit 1, but can be established with regard to properties of the transport area 20. For example, a transport segment in front of the transport unit 1 in the movement direction w, for example the next transport segment in front of the transport unit 1 in the movement direction w, can be defined as the safety area S. The safety position S is thus dependent on the position of the transport unit 1 and on the arrangement of the transport segment. Here, too, it is possible for a safety area S to comprise a fixedly predetermined or flexibly determined part of the transport area 20 before or after a transport segment which is in front of the transport unit 1 in the movement direction w. Likewise, a safety area S may begin only after a fixedly predetermined or flexibly determined distance before or after a transport segment which is in front of the transport unit 1 in the movement direction w.

According to the invention, a safety module M is provided for implementing a safety function. Depending on the design, the safety module M or the safety function either ensures, in accordance with a predetermined safety requirement level (SIL), that the transport unit 1 reaches the safety area S at a speed v less than or equal to a safety speed v_S or, in accordance with a predetermined safety requirement level, prevents the transport unit 1 from reaching the safety area S. The safety function can be permanently active. In the embodiments shown, the safety function is activated by triggering a safety state N by way of example.

A transport unit 1, which moves at a speed v, has a corresponding impulse due to its mass m, which leads to an impulse force. If the speed v is less than or equal to a safety speed v_S, then the impulse is also less than or equal to a safety impulse and, if the transport unit 1 interacts with an object or subject, the impulse force is less than or equal to a safety impulse force. The transport unit 1 is driven by the motor force $F_m$ which results from the product of the propulsive force forming current component iq and a constant ki. Other forces, for example a frictional force $F_f$, a gravitational force $F_g$, etc., can act on the transport unit 1, which together result in a total force $F_t$ acting on the transport unit 1. The equation of motion of an undisturbed moving transport unit 1 can be represented for example as follows: $m*a=F_t=F_m-F_g-F_f$, where the motor force $F_m$, the gravitational force $F_g$ and the frictional force $F_f$ in sum can be considered as the transport unit force $F_1$. If the transport unit 1 comes into contact with an object or subject (for example due to a collision), an interaction force $F_e$ also acts on the transport unit 1, meaning the equation of motion $m*a=F_t=F_m-F_g-F_f-F_e=F_1-F_e$, applies. The interaction force $F_e$ can be modeled with a penetration depth $x_e$ and a spring stiffness $k_e$ of the object or subject as $F_e=-k_e\,x_e$.

In order to limit the interaction force $F_e$ (and thus the penetration depth $x_e$), the speed v can be limited to a value less than or equal to the safety speed v_S. However, in addition or instead, the transport unit force $F_1$ can also be limited to less than a safety force F_S. The (kinetic) transport unit energy $E_1$ of the transport unit $(m*v^2/2)$ can also be limited to a value less than or equal to a safety energy E_s. This limits any interaction energy acting on the transport unit.

The transport unit 1 can be prevented from reaching the safety area S by a blocking element X (FIG. 2) arranged on the transport unit 1 and/or in the transport area 20 and/or by a deflection element U (FIG. 3) arranged on the transport unit 1 and/or in the transport area 20.

FIG. 2A, B and FIG. 3A, B relate to a long-stator linear motor as the electromagnetic transport system 2, with a transport path serving as the transport area 20. Only a section of the transport path is shown, with a safety area S arranged in front of the transport unit 1 in the movement direction w being provided.

FIG. 2C, D and FIG. 3C, D relate to a planar motor as the electromagnetic transport system 2, with a transport plane serving as the transport area 20. Only a section of the transport plane is shown, with a safety area S arranged in front of the transport unit 1 in the movement direction w being provided.

Figure 2D:
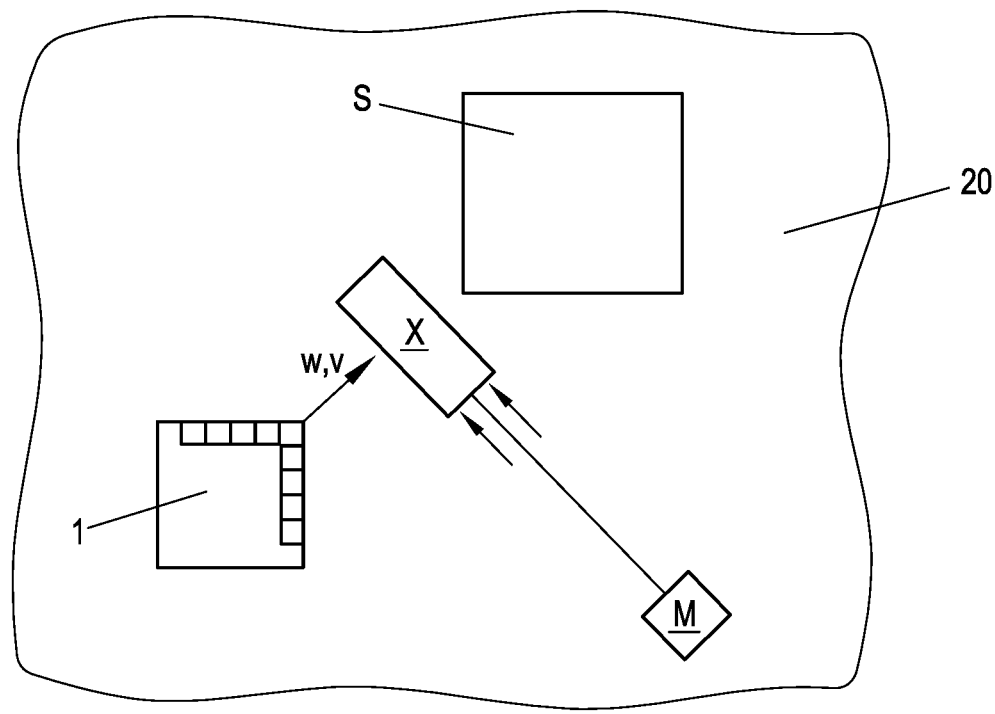

In FIG. 2A, B, C, d, the safety module M comprises a blocking element X. In FIGS. 2A and 2c, no safety state N is triggered, for which reason the blocking element X is in a rest position. The rest position is not located in the movement direction w and thus does not block the transport unit 1, allowing the transport unit 1 to move unhindered in the movement direction w. In FIGS. 2B and 2D, on the other hand, a safety state N is triggered and thus a safety function is activated, for which reason the blocking element X is brought into a blocking position which is located in the transport area 20, from the point of view of the transport unit 1, in front of the safety area S in the movement direction w. This physically prevents the transport unit 1 from getting into the safety area S and instead blocks it and brings it to a standstill by means of the blocking element X before the safety area S is reached. It is essential that this blocking is ensured by the safety module M and the blocking element X comprised thereby in accordance with a predetermined safety requirement level.

The blocking element X can be retracted laterally in the movement direction w, but also from above or below onto the transport area 20 and in the movement direction w or extended out of the transport area 20 in the movement direction w. The blocking element X can also be arranged on the transport unit 1 itself, for example in the form of extendable claws, a device for increasing the mechanical width, which leads to the transport unit 1 being blocked in the transport area 20, etc.

Figure 3D:
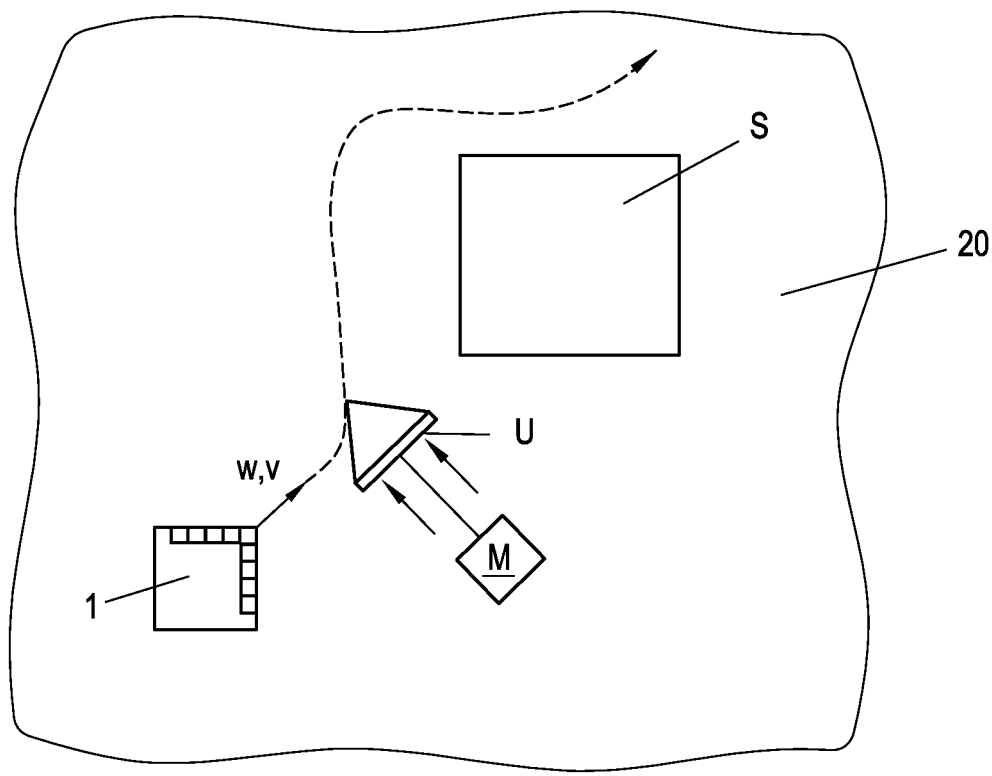

In FIG. 3A, B, C, C, the safety module M comprises a deflection element U. In FIG. 3A and FIG. 3C, no safety state N is triggered and therefore no safety function is activated, for which reason the deflection element U is in a rest position. This rest position is located away from the movement direction w, allowing the transport unit 1 to continue to move unhindered in the movement direction w. In FIGS. 3B and 3D, however, a safety state N is triggered and thus a safety function is activated, for which reason the deflection element U is brought into a deflection position which is located in the transport area 20 in front of the safety area S in the movement direction w. The transport unit 1 is deflected from the movement direction w by the deflection element U in the deflection position. This physically prevents the transport unit 1 from getting into the safety area S. Here, too, it is essential that this deflection is ensured by the safety module M and the deflection element U comprised thereby in accordance with a predetermined safety requirement level.

Deflection elements U do not have to absorb as high a kinetic energy of the transport unit 1 as do blocking elements X, since they do not stop the transport unit 1 completely. Deflection elements U can therefore be used in particular in transport units 1 which have or can be expected to have a high speed v.

In a long-stator linear motor as the electromagnetic transport system 2, switches already provided on the transport path can be used as deflection elements U, thus diverting the transport unit 1 to an alternative part of the transport path 20' which has no safety area S, as also shown in FIG. 3B.

Blocking elements X and/or deflection elements U are preferably provided in a stationary manner in the transport area 20, but can also be provided in a displaceable manner in the transport area 20 and thus also secure variable, i.e. non-stationary, safety areas S. Blocking elements X and deflection elements U are used in particular before safety areas S, which must meet a high safety requirement level.

Of course, it is also conceivable that a safety module M comprises one or more deflection elements U and one or more blocking elements X. A deflection element U and a blocking element X can also be used in relation to a safety area S in that the transport unit 1 is deflected before reaching the safety area S and is then blocked by a blocking element X. If the transport unit 1 has sufficient run-out time after being deflected by the deflection element U, it can be ensured that the transport unit 1 has a lower kinetic energy when the transport unit 1 is subsequently blocked by the blocking element X than when it is blocked immediately.

The safety module M can comprise a braking element E arranged on the transport unit 1 and/or in the transport area 20. The braking element E can be designed, in the context of the safety function, e.g. after activating same by triggering a safety state N, to ensure with a predetermined safety requirement level that the movement of the transport unit 1 is braked in such a way that it enters the safety area S at a speed v less than or equal to a safety speed v_S or to ensure that the transport unit 1 comes to a standstill before reaching the safety area S. The braking element E must be designed and dimensioned according to the predetermined safety requirement level.

The braking element E can act mechanically on the transport unit 1, for example by increasing a frictional force between the transport unit 1 and the transport area 20. This can be done, for example, by providing surfaces with a high coefficient of friction in the transport area 20 and/or by actively increasing a normal force acting on the transport unit 1.

The braking element E can also act magnetically on the transport unit 1. For example, a magnetic unit or an iron unit can be provided in order to decelerate the transport unit 1 via the action of magnetic force.

The braking element E can thus use any desired action mechanism to transmit force to the transport unit 1. For example, increased air resistance can also be used to brake the transport unit, for example by blowing in compressed air.

The force transmission mechanisms mentioned in combination with a blocking element E can also be used in a deflection element U to deflect the transport unit 1.

As part of the safety function, e.g. after activation of same by triggering the safety state N, the safety function can also ensure that at least a first set of the drive coils Sm is in short-circuit operation for at least a period of time. As part of the safety function, e.g. after activation of same by triggering the safety state N, the safety function can also ensure that at least a second set of the drive coils Sm is in open-circuit operation for at least a period of time. This is particularly advantageous in combination with one or more of the embodiments mentioned here (braking element E, blocking element X, deflection element U).

Both for short-circuit operation and open-circuit operation in accordance with the safety function, the safeguarding must be carried out with a correspondingly predetermined safety requirement level, namely such that the transport unit 1 reaches the safety area S at a speed v less than or equal to a safety speed v_S, or prevents the transport unit 1 from reaching the safety area S. For this purpose, the safety function or the safety module M can access the control unit 4 or can also be part of the control unit 4.

As part of the safety function, a transport unit 1 can be braked completely before reaching the safety area S or can be braked to a safety speed v_S until it reaches the safety area S by short-circuiting corresponding drive coils Sm, e.g. those interacting with the transport unit 1, or all drive coils Sm, or for example drive coils Sm arranged in the movement direction w, etc. For this purpose, for example, the switches of the full bridges VB/half bridges HB are brought by the control unit 4 to the appropriate position, and this can be initiated for example by a short-circuit regulator belonging to the safety module M. However, the short-circuit can of course be generated in other ways, for example by a switch parallel to the drive coils Sm. "Short-circuited" can mean a full short-circuit when using full bridges in the control unit 4.

It is particularly advantageous if, as part of the safety function, e.g. by activating same by triggering the safety state N, at least some of the drive coils Sm are in short-circuit operation for at least a first period of time, and, particularly preferably, at least some of the drive coils Sm are in open-circuit operation at least for a second period of time in order to generate a regulated short-circuit. A particularly efficient braking process for the transport unit 1 can thus be generated.

FIG. 4A shows a full bridge VB for energizing a drive coil Sm with a coil current $i_m$. The drive coil Sm has a first coil terminal Sm1 and a second coil terminal Sm2. The full bridge VB consists of two main branches. The first main branch consists of two switches S11, S21 which are in series at an operating voltage Ub formed by the difference between a first operating potential Ub1 and a second operating potential Ub2 at the input terminals of the full bridge VB. The second main branch also consists of two switches S11', S21' which are in series at the operating voltage Ub. Between the connection point of the first switch S11 and the second switch S21 of the first main branch is the first cross terminal Q1 for a shunt branch. Equivalently, between the connection point of the first switch S11' and the second switch S21' of the second main branch is the second cross terminal Q2 of the shunt branch. The first coil terminal Sm1 of the drive coil Sm is connected to the first cross terminal Q1, and the second coil terminal Sm2 of the drive coil Sm is connected to the second cross terminal Q2. By suitably actuating the switches S11, S21, S11', S21' using the control unit 4 (not shown here), the same electrical potential can be applied between the first coil terminal Sm1 and the second coil terminal Sm2 while the coil current $i_m$ is flowing. In the case of a full short-circuit, the switches S11 and S11' are thus switched through (with open switches S21 and S21') or the switches S21, S21' are switched through (with open switches S11, S11').

Half-bridges HB can also be actuated by the control unit 4 in order to energize the drive coils Sm with a coil current $i_m$, for example as shown in FIG. 4B. In this case, the second main branch of the full bridge VB is dispensed with, so that the operating voltage Ub is applied only at the first main branch, between the first input terminal A1 and the second input terminal B1 and the first switch S11 and second switch S21 connected in series therebetween. The connection point between the first S11 and the second switch S21 is referred to as the center point Cl, and is connected to the first terminal Sm1 of the drive coil Sm. The second terminal L12 of the drive coil Sm is at an electrical potential Ux at a regulation point C, which potential is for example predefined by a potential regulation unit. Usually, the second terminals Sm2 of all (not shown here) drive coils Sm are connected to the regulation point C and are regulated to the electrical potential Ux, which is usually equal to half the operating voltage Ub.

A direct short-circuit of the drive coil Sm by the two switches S11 and S12 is not possible when using a half-bridge HB, since the switches S11 and S21 must never be closed at the same time. In order not to short-circuit the operating voltage Ub, a "PWM short-circuit" is therefore provided when using half-bridges HB. A PWM short-circuit means that the upper switch S11 and the lower switch S21 of a half-bridge HB are switched alternately, e.g. by means of 50/50 clocking over a period T. Thus, the same potential Ux prevails at both terminals Sm1, Sm2 of the drive coil Sm—analogously to the full bridge VB shown in FIG. 4A, in which, in case of a full short-circuit, both coil terminals Sm1, Sm2 are either at the first operating potential Ub1 or the second operating potential Ub2. When changing the closed/open switches of a half-bridge HB, a minimum safety period can be maintained to eliminate any residual charges.

A PWM short-circuit is at no time equivalent to a full short-circuit, but can be interpreted as a short-circuit over a time integral of the coil voltage over a switching cycle. Of course, the drive coils Sm concerned are no longer supplied with the coil current $i_m$ by the regulation unit R in this case. However, owing to the further movement in the movement direction w, a coil short-circuit current icm is generated in the drive coils Sm coupled to the transport unit 1 due to a voltage induced by an EMF (electromagnetic force).

Since the stator current $i_A$ (in the dq coordinate system) is equal to the vectorial total current of all coil currents $i_m$, the short-circuit current ic (in the dq coordinate system) also results as the vectorial total of the coil short-circuit currents icm. FIG. 3 shows the plot over time of a short-circuit current ic in the case of a permanent short-circuit during a braking process. It can be seen that, from the braking time point O, the short-circuit current ic initially has a classic plot of a short-circuit current ic of a stator with oscillation behavior. Thus, after a subtransient plot, a transient plot occurs, whereupon an approximately constant plot follows, which in turn finally drops and tends to zero. This drop is caused by the fact that the driving electromagnetic force (EMF) decreases since the speed of the transport unit 1 is already low at this time.

Also shown in FIG. 5 is the plot of the propulsive-force-generating short-circuit current component icq and the field-forming short-circuit current component icd of the short-circuit current ic, i.e. the component which points in the field direction. The propulsive-force-generating short-circuit current component icq is responsible for braking of the transport unit 1, just as the propulsive-force-generating current component iq is responsible for the movement of the transport unit 1 in the movement direction w in normal operation. Therefore, it is desirable to additionally increase or maximize the propulsive-force-generating short-circuit current component icq during a regulated short-circuit mode K. A suitable choice of the short-circuit and open-circuit phases will facilitate this enlargement of the propulsive-force-generating short-circuit current component icq.

An estimate of the relationship between the propulsive-force-generating current component iq as a function of the total short-circuit current ic can be formed without requiring additional information regarding the position or angle. This is based on stator voltage equations formed for a multi-phase power supply. The stator equations are solved according to the speed and the steady state case (i.e. no changes over time, which in turn means a speed of zero) is assumed.

Taking into account the relationship $ic = \sqrt{icq^2 + icd^2}$, the stator equations are solved according to $$iq = ic\sqrt{1 - ic^2\left(\frac{L}{\Psi}\right)^2}.$$

The flux of the permanent magnet $\Psi$ can be approximately assumed to be constant. The relationship thus determined is used in the force equation, whereupon the force equation is derived according to the short-circuit current ic. Setting the derived force equation to zero corresponds to an optimal relationship of the propulsive-force-generating current component iq to the total short-circuit current ic, i.e. a maximization of the propulsive-force-generating current component iq. From this, the relationship f for the optimal target short-circuit current ic_soll can be derived:

$$ic\_soll = \frac{1}{\sqrt{2}}\frac{\Psi}{L}.$$

The optimal target short-circuit current ic_soil with a maximum propulsive-force-generating short-circuit current component icq can thus be determined on the basis of the stator voltage equations according to the relationship f:

$$ic\_soll = \frac{1}{\sqrt{2}}\frac{\Psi}{L}.$$

The corresponding values for the inductance L and the flux $\Psi$ can be determined by experiments, for example.

FIG. 6 shows the approximated relationship of the braking force Fb as a function of the short-circuit current ic for a certain speed of the transport unit 1, the short-circuit current ic being plotted on the abscissa and the effective braking force Fb being plotted on the ordinate. The optimal target short-circuit current ic_soil is also plotted and represents the short-circuit current ic which gives a maximum braking force Fb since the propulsive-force-generating short-circuit current component icq is maximized.

In order to determine the actual short-circuit current ic at the beginning of a braking process, but also in each cycle after the start of the braking process, all drive coils Sm, the drive coils Sm of a segment, or only those drive coils Sm (if known) coupled to the transport unit 1 can be short-circuited for a short time. The short-circuit current ic can be calculated as the vectorial total of the coil short-circuit currents icm that are measured.

FIG. 7 shows a typical period T in which the short-circuit interval tc_ks and the open-circuit interval tc_II alternate. The period T is assumed to be constant here, for example, but of course can also vary.

When a full bridge VB is used (see FIG. 2A), the switches S11, S21, S11', S21' are open in the open-circuit interval tc_II and the switches S21 and S21' or the switches S11 and S11' are switched through in the short-circuit interval tc_ks for a full short-circuit. In the open-circuit interval tc_II, all four switches S11, S21', S11', S21 of the full bridge VB are open. When using a half-bridge HB (see FIG. 2B), the switches S11 and S21 are open in the open-circuit interval tc_II and are alternately closed in the short-circuit interval tc_ks, for example in a 50/50 ratio.

As borderline cases, a short-circuit interval tc_II of zero (i.e. an open-circuit interval tc_II in the amount of the period T) or a short-circuit interval tc_II in the amount of the period T (and thus an open-circuit interval tc_II of zero) would be conceivable. However, the short-circuit interval tc_II should advantageously not be at zero, but just above it, preferably for the minimum safety period, in particular in the case of a PWM short-circuit of a half-bridge HB.

The selection of the correct ratio of short-circuit interval tc_ks to open-circuit interval tc_II can be carried out by means of the short-circuit regulator K, which can be connected upstream of the regulation unit R (as indicated in FIG. 1), or can be an integral part of the regulation unit R.

Advantageously, three phases A, B, C are provided in the regulated short-circuit mode K. In a short-circuit phase A in which the short-circuit current ic is smaller than the target short-circuit current ic_soll multiplied by a factor a, ic<ic_soll·a, at least some of the drive coils Sm interacting with a transport unit 1 are in short-circuit operation over each period T, i.e. permanently, since the actual short-circuit current ic is smaller than the target short-circuit current ic_soll. When using full bridges VB in the control unit 4, this can mean a full short-circuit, or when using half-bridges HB in the control unit 4, this can mean a "PWM short-circuit." This means that, in the short-circuit phase A within each period T, the short-circuit interval tc_ks is maximized and the open-circuit interval is II is minimized. In this case, the short-circuit interval tc_ks can extend over the entire period T, so that the open-circuit interval tc_II is zero. Basically, for the short-circuit phase A, a minimum duration for the open-circuit phase tc_II (i.e. a maximum duration for the short-circuit phase tc_ks) can be provided, which can correspond to a predefined minimum safety period. For example, for a period T of 25 µs, the minimum duration of the open-circuit phase tc_II may correspond to a predefined minimum safety period, for example 500 ns.

In a mixed phase B in which the short-circuit current ic is equal to or exceeds the target short-circuit current ic_soll multiplied by a factor a, ic≥ic_soll·a, and is advantageously smaller than the target short-circuit current ic_soll multiplied by (2−a): ic<ic_soll·(2−a), at least some of the drive coils Sm are alternately in short-circuit and in open-circuit operation. This means that in a period T the short-circuit interval tc_ks and the open-circuit interval tc_II alternate. In particular, the respective durations of the short-circuit interval tc_ks and the open-circuit interval tc_II can be calculated within a period T for the mixed phase B via a third-order polynomial with an error deviation e_ic. The error deviation e_ic represents the deviation of the short-circuit current ic from the target short-circuit current ic_soll.

In an open-circuit phase C in which the short-circuit current ic is equal to or exceeds the target short-circuit current ic_soll multiplied by the term (2−a) ic≥ic_soll·(2−a), at least some of the drive oils Sm are in open-circuit operation. The control unit 4 maximizes the open-circuit interval tc_II and minimizes the short-circuit interval tc_ks. In this case, the open-circuit interval tc_II can extend over the entire period T, so that the short-circuit interval tc_ks is zero. However, a minimum short-circuit interval tc_ks greater than zero or a maximum open-circuit interval tc_II smaller than the period T can also be provided. If, for example, a factor a of zero is selected, then only the mixed phase B is used.

If, for example, a factor a of one is selected, the operation takes place in the short-circuit phase A if the short-circuit current ic is less than the target short-circuit current ic_soll, and the open-circuit phase C if the short-circuit current ic is equal to or greater than the target short-circuit current ic_soll. Accordingly, there is no mixed phase B in this special case.

The factor a can be determined in advance or predetermined, with a factor of a=0.85 having proven to be particularly advantageous for a short-circuit current regulation of an electromagnetic transport system. The boundary between the open-circuit phase A and the mixed phase B is shown in dashed lines in FIG. 4 for a factor a=0.85, as is the boundary between the mixed phase B and the short-circuit phase C.

Advantageously, in the mixed phase B, at least some of the drive coils Sm can in each case alternately be in short-circuit operation for a short-circuit interval tc_ks and in open-circuit operation for an open-circuit interval tc_II, the duration of the short-circuit interval tc_ks being determined with respect to the open-circuit interval tc_II.

FIG. 8A shows a plot of the short-circuit current ic against the open-circuit phase tc_II, there being a switch from the short-circuit phase A to the open-circuit phase C via the mixed phase B. Here, the open-circuit interval tc_II is not quite zero even in the short-circuit phase A, since a minimum duration is provided for the open-circuit phase tc_II. FIG. 8B shows a plot of the error deviation e_against the open-circuit phase tc_II from the open-circuit phase C via the second phase B into the first short-circuit phase A. Since a third order polynomial is used to calculate the open-circuit interval tc_II and the short-circuit interval tc_ks in the mixed phase B for the error deviation e_ic, soft transitions into and out of the mixed phase B can be achieved for the short-circuit current ic, thus keeping noise of the short-circuit current ic low. Alternatively, it would also be possible to provide no mixed phase B and to switch hard from the short-circuit phase A to the open-circuit phase C or vice versa.

In FIG. 9, the plot over time of a first short-circuit current ic1 for a permanent, or 50/50 PWM short-circuit and a second short-circuit current ic2 generated according to the invention is shown. For the first short-circuit current ic1 a maximum short-circuit phase tc_ks is selected, i.e. a permanent phase A. In the lower part of FIG. 9 there is a plot over time of a first braking force Fb1 which results from the first short-circuit current ic1 and a plot over time of a second braking force Fb2 which results from the second short-circuit current ic2. It can be seen that the second braking force Fb2 is higher than the first braking force Fb1 in particular directly after the start of the braking process, although the second short-circuit current ic2 is smaller than the first short-circuit current ic1, a situation which results from an increased propulsive-force-generating short-circuit current component icq in accordance with the invention. In addition, the oscillation behavior of the second short-circuit current ic2 is improved.

The selection of the drive coils Sm energized according to the regulated short-circuit mode K can essentially be free. Thus, all drive coils Sn or some of the drive coils Sn can be switched to the regulated short-circuit mode K. Advantageously, the drive coils Sm magnetically coupled to the transport unit T1 can be switched to the regulated short-circuit mode K.

Determination of which drive coils Sm are coupled to the transport unit 1 can be made via the current position of the transport unit 1. This position detection can take place by means of suitable position sensors which may already be provided on the electromagnetic transport system, for example as described in AT 519 238 A1.

However, those drive coils Sm which conduct a coil short-circuit current icm (which is measured) in the short-circuited state can also be detected. From this it can be concluded which of the drive coils Sm are magnetically coupled to the transport unit 1.

If it is detected that the transport unit 1 continues to move during the braking process in such a way that a further drive coil Sm located in the movement direction w is coupled to the transport unit 1 (e.g. since a coil short-circuit current icm is induced), then this drive coil Sm can also be switched to the short-circuit mode K. This usually has the consequence that a drive coil Sm is no longer coupled to the transport unit 1 counter to the movement direction w, and so it no longer has to remain in the short-circuit mode K. However, the fact that the drive coil Sm is no longer coupled to the transport unit 1 counter to the movement direction w can also be detected via position sensors or via the non-induction of a coil short-circuit current icm. It can be detected that the last drive coil Sm coupled counter to the movement direction w is no longer coupled to the transport unit 1, which indicates that the next coil Sm located in the movement direction w is operated in the short-circuit mode K instead of the first-mentioned drive coil Sm.

Advantageously, the short-circuit current is can be limited, for example to a threshold value icmax. This can be done by switching from short-circuit to open-circuit operation. Thus, it is possible to control the (average) short-circuit current ic—as long as enough kinetic energy is present in the transport unit 1.

All implementations of the safety functions described here have in common that they each have to meet a predetermined safety requirement level. The safety function can be implemented by one or a combination of the described embodiments: Operation of at least some of the drive coils Sm in open-circuit, operation of at least some of the drive coils Sm in short-circuit, operation of at least some of the drive coils Sm in regulated short-circuit, provision of a braking element E on the transport unit 1 and/or in the transport area 20, provision of a blocking element X on the transport unit 1 and/or in the transport area 20, provision of a deflection element U on the transport unit 1 and/or in the transport area 20. The same or different safety areas S, as well as the same or different safety requirement levels, can be provided for these measures.

The invention claimed is:

1. A method for controlling a transport unit of an electromagnetic transport system, the electromagnetic transport system comprising:
 a controller and drive coils arranged in a transport area, the controller energizing the drive coils in normal operation to create a magnetic field moving in a movement direction in the transport region that is couplable to a transport unit in order to move the transport unit in the transport region in the movement direction,
 wherein a safety area is provided in the transport area, and
 wherein a safety function is provided which, in accordance with a predetermined safety requirement level, ensures that the transport unit reaches the safety area at a speed less than or equal to a safety speed and/or with a transport unit force less than or equal to a safety force and/or a transport unit energy less than or equal to a safety energy, or prevents the transport unit from reaching the safety area.

2. The method according to claim 1, wherein the safety function is activated by triggering a safety state.

3. The method according to claim 1, wherein the safety function is permanently active.

4. The method according to claim 1, wherein the safety function is at least partially, preferably completely redundant and/or the safety function comprises a diagnostic function that checks the functionality of the safety function.

5. The method according to claim 1, wherein the safety function fulfills at least safety requirement level 1 according to the IEC 61508 standard series and preferably fulfills further safety requirements of at least one of the IEC 61508 standard series and/or ISO 13849, IEC 62061 standards.

6. The method according to claim 1, wherein the safety area is provided in a stationary manner in the transport area.

7. The method according to claim 1, wherein the position of the safety area in the transport area is dynamically determined.

8. The method according to claim 1, wherein a safe deceleration area is provided in front of the transport unit in the movement direction, and in that the safety area begins after the safe deceleration area.

9. The method according to claim 1, wherein, as part of the safety function, at least a first set of the drive coils is in short-circuit operation for at least a period of time.

10. The method according to claim 1, wherein, as part of the safety function, at least a second set of the drive coils is in open-circuit operation for at least a period of time.

11. The method according to claim 1, wherein, as part of the safety function, at least a third set of the drive coils is in short-circuit operation for at least a first period of time, and in that at least some of the drive coils are in open-circuit operation for at least a second period of time.

12. An electromagnetic transport system comprising:
 a control unit controller,
 a plurality of drive coils arranged in a transport area and at least one transport unit,
 wherein the controller is designed to energize the drive coils to create a magnetic field moving in a movement direction in the transport area that is coupled to the transport unit in the transport area to move the transport unit in the movement direction in order to move the transport unit in the movement direction,
 wherein a safety area is provided in the transport area and
 wherein a safety module is provided which is designed, in accordance with a predetermined safety requirement level, to ensure that the transport unit reaches the safety area at a speed less than or equal to a safety speed and/or with a transport unit force less than or equal to a safety force and/or with a transport unit energy less than or equal to a safety energy, or to prevent the transport unit from reaching the safety area.

13. The electromagnetic transport system according to claim 12, wherein the safety module comprises a braking element which is arranged on the transport unit and/or in the transport area and which is designed, in accordance with a predetermined safety requirement level, to ensure that the movement of the transport unit is braked in such a way that it reaches the safety area at a speed less than or equal to a safety speed and/or with a transport unit force less than or equal to a safety force and/or a transport unit energy less than or equal to a safety energy, or to prevent the transport unit from reaching the safety area.

14. The electromagnetic transport system according to claim 12, wherein the safety module comprises a blocking element which is arranged on the transport unit and/or in the transport area and which is designed, with a predetermined safety requirement level, to ensure that the movement of the transport unit is blocked in such a way that reaching the safety area is prevented.

15. The electromagnetic transport system according to claim 12, wherein the safety module comprises a deflection element which is arranged on the transport unit and/or in the transport area and which is designed, with a predetermined safety requirement level, to ensure that the movement of the transport unit is deflected out of the safety area before reaching the safety area.

16. The electromagnetic transport system according to claim 12, wherein the electromagnetic transport system is designed as a long-stator linear motor and/or planar motor.

* * * * *